United States Patent
Li et al.

(10) Patent No.: US 10,952,168 B2
(45) Date of Patent: Mar. 16, 2021

(54) METHOD FOR TRANSMITTING DOWNLINK CONTROL SIGNAL AND APPARATUS

(71) Applicant: Huawei Technologies Co., Ltd., Shenzhen (CN)

(72) Inventors: Sainan Li, Chengdu (CN); Huang Huang, Shenzhen (CN); Xi Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/400,382

(22) Filed: May 1, 2019

(65) Prior Publication Data

US 2019/0261296 A1    Aug. 22, 2019

Related U.S. Application Data

(63) Continuation of application No. PCT/CN2017/108970, filed on Nov. 1, 2017.

(30) Foreign Application Priority Data

Nov. 3, 2016    (CN) .......................... 201610974038.8
Nov. 3, 2016    (CN) .......................... 201610974445.9

(51) Int. Cl.
*H04W 56/00* (2009.01)
*H04J 11/00* (2006.01)
(Continued)

(52) U.S. Cl.
CPC ....... *H04W 56/001* (2013.01); *H04J 11/0069* (2013.01); *H04L 5/0007* (2013.01);
(Continued)

(58) Field of Classification Search
CPC ........... H04W 56/001; H04W 72/0446; H04W 72/046; H04W 74/0833; H04W 72/042;
(Continued)

(56) References Cited

U.S. PATENT DOCUMENTS 8,923,197 B2    12/2014  Pi et al.
2006/0052139 A1    3/2006  Teo et al.
(Continued)

FOREIGN PATENT DOCUMENTS

CN    1493166 A    4/2004
CN    101034925 A    9/2007
(Continued)

OTHER PUBLICATIONS

NTT DOCOMO, Inc., "Discussion on initial access design for NR," 3GPP TSG RAN WG1 Meeting #86bis, R1-1610073, Lisbon, Portugal, Oct. 10-14, 2016, 7 pages.
(Continued)

*Primary Examiner* — Kiet Tang
(74) *Attorney, Agent, or Firm* — Slater Matsil, LLP

(57) ABSTRACT

Embodiments provide a method for transmitting a downlink control signal, and an apparatus. The method includes: sending, by a base station, one or more radio frames, where the one or more radio frames include a plurality of OFDM symbols that carry synchronization signals, each OFDM symbol that carries a synchronization signal is sent by using one or more downlink beams of the base station, and the OFDM symbol that carries the synchronization signal further carries a downlink control signal. The downlink control signal is placed in the OFDM symbol that carries the synchronization signal.

20 Claims, 4 Drawing Sheets

(51) Int. Cl.
*H04L 5/00* (2006.01)
*H04L 27/26* (2006.01)
*H04W 72/04* (2009.01)
*H04W 74/08* (2009.01)
*H04B 7/06* (2006.01)

(52) U.S. Cl.
CPC .......... *H04L 5/0023* (2013.01); *H04L 5/0048* (2013.01); *H04L 5/0053* (2013.01); *H04L 27/2655* (2013.01); *H04W 72/046* (2013.01); *H04W 72/0446* (2013.01); *H04W 74/0833* (2013.01); *H04B 7/0617* (2013.01)

(58) Field of Classification Search
CPC ............. H04W 72/1289; H04L 5/0053; H04L 5/0023; H04L 5/0048; H04L 5/0007; H04L 27/2655; H04J 11/0069; H04B 7/0617; H04B 7/088; H04B 7/0695
See application file for complete search history.

(56) References Cited

U.S. PATENT DOCUMENTS

| | | | | |
|---|---|---|---|---|
| 2010/0309808 | A1* | 12/2010 | Miki | .................... H04L 5/0055 370/252 |
| 2014/0226583 | A1* | 8/2014 | Oizumi | ................ H04L 5/0053 370/329 |
| 2016/0044711 | A1 | 2/2016 | Lou et al. | |
| 2016/0119895 | A1 | 4/2016 | Agiwal et al. | |
| 2016/0308637 | A1 | 10/2016 | Frenne et al. | |
| 2016/0374055 | A1* | 12/2016 | Morita | ................ H04W 72/042 |
| 2017/0311274 | A1 | 10/2017 | Yu et al. | |
| 2019/0200537 | A1 | 7/2019 | Yahya | |
| 2020/0021349 | A1* | 1/2020 | Chapman | ............... H04B 7/043 |

FOREIGN PATENT DOCUMENTS

| | | |
|---|---|---|
| CN | 101425991 A | 5/2009 |
| CN | 105052235 A | 11/2015 |
| CN | 105723639 A | 6/2016 |
| EP | 2800433 A1 | 11/2014 |
| JP | 2014532320 A | 12/2014 |
| JP | 2017503386 A | 1/2017 |
| WO | 2013168794 A1 | 11/2013 |
| WO | 2015080646 A1 | 6/2015 |
| WO | 2018025496 A1 | 2/2018 |
| WO | 2018025946 A1 | 2/2018 |

OTHER PUBLICATIONS

ETRI, "Band-agnostic initial access for NR," 3GPP TSG RAN WG1 Meeting #86, R1-166944, Gothenburg, Sweden, Aug. 22-26, 2016, 4 pages.

Huawei et al., "Unified single/multiple beam-based initial access procedure in NR," 3GPP TSG RAN WG1 Meeting #86bis, R1-1608823, Lisbon, Portugal, Oct. 10-14, 2016, 6 pages.

Mitsubishi Electric, "Common signal/information allocation for initial access and mobility," 3GPP TSG-RAN WG1 #86bis, R1-1608711, Lisbon, Portugal, Oct. 10-14, 2016, 7 pages.

CMCC, "RACH in Gradual UE-Specific (GUS) initial access," 3GPP TSG RAN WG1 Meeting #86bis, R1-1609309, Lisbon, Portugal, Oct. 10-14, 2016, 7 pages.

Qualcomm Inc., "Multi beam SYNC design", 3GPP TSG RAN WG1 Meeting #86b, R1-1610159, Lisbon, Portugal, Oct. 10-14, 2016, 9 pages.

* cited by examiner

METHOD FOR TRANSMITTING DOWNLINK CONTROL SIGNAL AND APPARATUS

CROSS-REFERENCE TO RELATED APPLICATIONS

This application is a continuation of International Application No. PCT/CN2017/108970, filed on Nov. 1, 2017, which claims priority to Chinese Patent Application No. 201610974038.8, filed on Nov. 3, 2016 and Chinese Patent Application No. 201610974445.9, filed on Nov. 3, 2016. The disclosures of the aforementioned applications are hereby incorporated by reference in their entireties.

TECHNICAL FIELD

The present invention relates to the field of wireless communications, and more specifically, to a method for transmitting a downlink control signal, and an apparatus.

BACKGROUND

To meet requirements of a mobile communications system for large-capacity and high-rate transmission, a high frequency band, for example higher than 6 GHz, is introduced for communication to utilize high-bandwidth and high-rate transmission features of the high frequency band. This is a popular technology research topic of a 5G communications system. Due to a high path loss of high-frequency communication, a narrow beam needs to be used to ensure a propagation distance and a high beam gain. However, a coverage area of the narrow beam is limited. To ensure communication quality, narrow beam alignment needs to be performed between a high-frequency base station and a terminal device. This poses a challenge to the design of channels, such as a broadcast channel, a control channel, a synchronization channel, and a random access channel. In an existing cellular mobile communications system, the foregoing channels are sent and received using an omnidirectional antenna. A terminal in any location may receive information on the foregoing channels sent by the base station. However, in high-frequency communication, because the narrow beam is used as a directional beam, if an omnidirectional coverage effect in an existing mobile communications system needs to be achieved, all directional beam combinations at a transmit end and a receive end need to be traversed. If both the transmit end and the receive end use directional beams, there is a large quantity of beam combinations. For example, if the transmit end and the receive end each use four directional beams, a total of 16 directional beam combinations are generated, and cause a rapid increase of overheads of a high-frequency system. In addition, the base station needs to separately send signaling to notify the terminal device of corresponding beam resource information, thereby increasing system overheads.

SUMMARY

The present invention provides a method for transmitting a downlink control signal, and an apparatus, to reduce system overheads.

According to one aspect, a method for transmitting a downlink control signal is disclosed. The method includes sending, by a base station, one or more radio frames, where the one or more radio frames include a plurality of OFDM (orthogonal frequency division multiplexing) symbols that carry synchronization signals. Each OFDM symbol that carries a synchronization signal is sent using one or more downlink beams of the base station, and the OFDM symbol that carries the synchronization signal further carries a downlink control signal.

Before the method, the following is included: generating, by the base station, the one or more radio frames.

According to another aspect, a method for transmitting a downlink control signal is disclosed. The method includes completing, by a base station, beam alignment and downlink synchronization with a terminal device. The method also includes sending, by the base station, a downlink control signal to the terminal device by using a downlink beam aligned with the terminal device, where the downlink control signal is placed in an OFDM symbol that carries a synchronization signal.

In the foregoing two aspects, the method for transmitting a downlink control signal is described from the base station side.

According to still another aspect, a method for transmitting a downlink control signal is disclosed. The method includes receiving, by a terminal device, an OFDM symbol that carries a synchronization signal and that is sent by a base station by using a downlink beam aligned with the terminal device, where the OFDM symbol that carries the synchronization signal further carries a downlink control signal. The method also includes detecting, by the terminal device, the downlink control signal in a specified resource element location of the OFDM symbol that carries the synchronization signal.

Accordingly, based on the foregoing methods, apparatuses are further provided.

A base station is provided. The base station includes a generation module, configured to generate one or more radio frames. The base station also includes a sending module, configured to send the one or more radio frames, where the one or more radio frames include a plurality of OFDM symbols that carry synchronization signals, each OFDM symbol that carries a synchronization signal is sent using one or more downlink beams of the base station, and the OFDM symbol that carries the synchronization signal further carries a downlink control signal.

A base station is provided. The base station includes a beam scanning module, configured to complete beam alignment and downlink synchronization with a terminal device. The base station also includes a sending module, configured to send a downlink control signal to the terminal device by using a downlink beam aligned with the terminal device, where the downlink control signal is placed in an OFDM symbol that carries a synchronization signal.

A terminal device is provided. The terminal device includes a receiving module, configured to receive an OFDM symbol that carries a synchronization signal and that is sent by a base station using a downlink beam aligned with the terminal device, where the OFDM symbol that carries the synchronization signal further carries a downlink control signal. The terminal device also includes a detection module, configured to detect the downlink control signal in a specified resource element location of the OFDM symbol that carries the synchronization signal.

In the foregoing aspects, the method for transmitting a downlink control signal is described from the terminal device side.

With reference to the foregoing aspects, before the method, the following is included: detecting, by the terminal device, a synchronization signal sent by the base station, and reporting, to the base station, a beam ID of a beam to which the synchronization signal belongs.

With reference to the foregoing aspects, in downlink beams of the plurality of OFDM symbols that carry the synchronization signals, each transmit beam of the base station is traversed.

With reference to the foregoing aspects, at least two OFDM symbols are sent using different beams.

The at least two OFDM symbols carry different beam numbers, or the at least two OFDM symbols carry different reference signal sequences that are used to indicate beam numbers, or the at least two OFDM symbols carry different reference signal resource numbers that are used to indicate beam numbers.

With reference to the foregoing aspects, the downlink control signal is a random access response, paging information, or a control format indicator; or may be a downlink control signal of another type.

With reference to the foregoing aspects, the downlink control signal is carried by a PDCCH (physical downlink control channel), a PCFICH (physical control format indicator channel), or a PDSCH (physical downlink shared channel). To be specific, the OFDM symbol that carries the synchronization signal and that is sent by the base station using a downlink beam aligned with the terminal device further carries at least one of the following: a PDCCH, PCFICH, or PDSCH resource.

With reference to the foregoing aspects, the paging information is a paging occasion (PO), including a radio network temporary identifier and resource information of a paging message for the terminal device.

With reference to the foregoing aspects, the control format indicator is used to indicate PDCCH resource allocation in a direction of the beam.

With reference to the foregoing aspects, the plurality of OFDM symbols that carry the synchronization signals are located in one or more subframes of the radio frame.

With reference to the foregoing aspects, the downlink control signal occupies a specified resource element (RE) of the OFDM symbol.

With reference to the foregoing aspects, the downlink control signal is sent by the base station by using the downlink beam aligned with the terminal device, to simplify blind detection and reduce power consumption of the terminal device.

With reference to the foregoing aspects, the OFDM symbol that carries the synchronization signal is sent by the base station by using the downlink beam aligned with the terminal device.

According to yet another aspect, a method for transmitting a PDCCH resource is disclosed. The method includes receiving, by a base station, a PDCCH resource request message sent by a terminal device. The method also includes sending, by the base station to the terminal device by using a downlink beam aligned with the terminal device, a PDCCH resource allocated to the terminal device, where the PDCCH resource is located in an OFDM symbol that carries a synchronization signal.

According to still yet another aspect, a method for transmitting a PDCCH resource is disclosed. The method includes sending, by a terminal device, a PDCCH resource request message to a base station. The method also includes receiving, by the terminal device, a PDCCH resource that is sent by the base station using a downlink beam aligned with the terminal device, where the PDCCH resource is allocated by the base station, and is located in an OFDM symbol that carries a synchronization signal.

In addition, based on the foregoing methods, apparatuses are further provided.

A base station is provided. The base station includes a receiving module, configured to receive a PDCCH resource request message sent by a terminal device. The base station also includes an allocation module, configured to send, to the terminal device using a downlink beam aligned with the terminal device, a PDCCH resource allocated to the terminal device, where the PDCCH resource is located in an OFDM symbol that carries a synchronization signal.

A terminal device is provided. The terminal device includes a sending module, configured to send a PDCCH resource request message to a base station. The terminal device also includes a receiving module, configured to receive a PDCCH resource that is sent by the base station using a downlink beam aligned with the terminal device, where the PDCCH resource is allocated by the base station, and is located in an OFDM symbol that carries a synchronization signal.

The foregoing two solutions disclose transmission of the PDCCH resource in a scheduling manner, and are described separately from the base station side and the terminal device side, and features related to a solution in a non-scheduling manner may all be applied to the scheduling manner.

With reference to the foregoing aspects, the PDCCH resource is used to carry a downlink control signal.

With reference to the foregoing aspects, the downlink control signal is a random access response, paging information or resource allocation information, HARQ (hybrid automatic repeat request) information, a power control command, a modulation and coding scheme, or the like.

With reference to the foregoing aspects, the PDCCH resource request message is carried by RRC signaling.

With reference to the foregoing aspects, before the method, the following is further included: completing, by the base station, beam scanning and alignment with the terminal device, where the base station receives a beam ID sent by the terminal device, and determines the downlink beam aligned with the terminal device.

With reference to the foregoing aspects, before the method, the following is further included: detecting, by the terminal device, a synchronization signal sent by the base station, and reporting, to the base station, a beam ID of a beam to which the synchronization signal belongs.

In the foregoing solutions, the synchronization signal and the downlink control signal are placed in a same OFDM symbol, and occupy different frequency domain resources, in other words, the synchronization signal and the downlink control signal are arranged in a frequency division manner. In another solution, the synchronization signal and the downlink control signal may be arranged in a time division manner, and occupy different time resources. Details are provided below.

According to a further aspect, a method for transmitting a downlink control signal is disclosed. The method includes generating, by a base station, one or more radio frames. The method also includes sending, by the base station, the one or more radio frames. The one or more radio frames include a plurality of blocks, each block carries a synchronization signal and a downlink control signal, the synchronization signal and the downlink control signal are arranged in a time division manner, each block is sent using one or more downlink beams of the base station, and at least two blocks are sent by using different beams.

The plurality of blocks include at least two blocks that are consecutive in time.

According to a still further aspect, a method for transmitting a downlink control signal is disclosed. The method includes receiving, by a terminal device, a block that carries a synchronization signal and a downlink control signal and that is sent by a base station using a downlink beam aligned with the terminal device. The synchronization signal and the downlink control signal are arranged in a time division manner. The method also includes detecting, by the terminal device, the downlink control signal in a specified resource element location of the block.

The present invention is described above separately from the base station side and the terminal device side.

Based on the foregoing methods, corresponding apparatuses are further provided.

A base station is provided. The base station includes a generation module, configured to generate one or more radio frames. The base station also includes a sending module, configured to send the one or more radio frames. The one or more radio frames include a plurality of blocks, each block carries a synchronization signal and a downlink control signal, the synchronization signal and the downlink control signal are arranged in a time division manner, each block is sent using one or more downlink beams of the base station, and at least two blocks are sent using different beams.

The plurality of blocks include at least two blocks that are consecutive in time.

A terminal device is provided. The terminal device includes a receiving module, configured to receive a block that carries a synchronization signal and a downlink control signal and that is sent by a base station using a downlink beam aligned with the terminal device. The synchronization signal and the downlink control signal are arranged in a time division manner. The terminal device also includes a detection module, configured to detect the downlink control signal in a specified resource element location of the block.

With reference to the foregoing aspects, the at least two blocks carry different beam numbers, or the at least two blocks carry different reference signal sequences that are used to indicate beam numbers, or the at least two blocks carry different reference signal resource numbers that are used to indicate beam numbers.

With reference to the foregoing aspects, the synchronization signal and the downlink control signal are carried by different OFDM symbols.

With reference to the foregoing aspects, the synchronization signal includes a PSS and/or an SSS, and each block includes one PSS and/or one SSS.

With reference to the foregoing aspects, the downlink control signal is a random access response, paging information, or a control format indicator.

With reference to the foregoing aspects, the downlink control signal is carried by a PDCCH, a PCFICH, or a PDSCH.

With reference to the foregoing aspects, the downlink control signal is a random access response, paging information, or a control format indicator.

With reference to the foregoing aspects, the paging information is a paging occasion PO, including a radio network temporary identifier and resource information of a paging message.

With reference to the foregoing aspects, the control format indicator is used to indicate PDCCH resource allocation in the beam direction.

With reference to the foregoing aspects, the plurality of blocks is located in one or more subframes of the radio frame.

With reference to the foregoing aspects, the downlink control signal occupies a specified resource element in the block.

With reference to the foregoing aspects, the block that carries the downlink control signal is sent by the base station by using a downlink beam aligned with the terminal device, further simplifying blind detection.

In addition, features in the foregoing methods for sending a downlink signal in the frequency division manner may all be applied to the time division manner, and the two manners differ only in frame structures.

In the foregoing aspects of the embodiments of the present invention, the downlink control signal is placed in the OFDM symbol that carries the synchronization signal, or the downlink control signal is placed in the block that carries the synchronization signal, thereby reducing signaling overheads.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may derive other drawings from these accompanying drawings without creative efforts.

DETAILED DESCRIPTION OF ILLUSTRATIVE EMBODIMENTS

Figure 1:
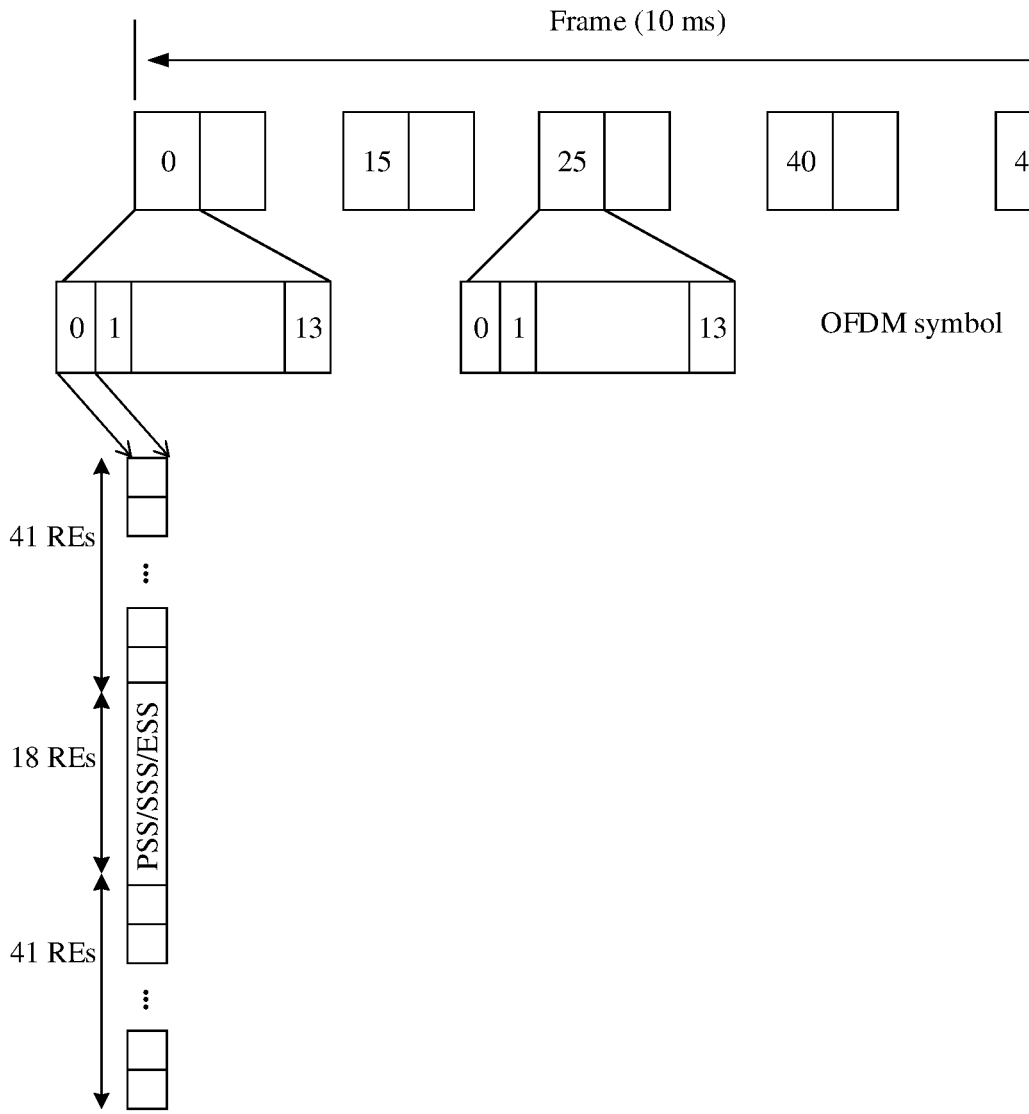
FIG. 1 is a schematic diagram of a frame structure of a synchronization radio frame carrying a downlink control signal according to an embodiment of the present invention.

Embodiments of the present invention may be used in wireless networks of various technologies. A radio access network may include different network elements in different systems. For example, in LTE (Long Term Evolution) and LTE-A (LTE Advanced), a network element of a radio access network includes an eNB (eNodeB, evolved NodeB), and a network element in a WLAN (wireless local area network, e.g. a Wi-Fi network) includes an access point (AP), and the like. Solutions similar to those of the embodiments of the present invention may be applied to another wireless network, but related modules in base station systems may be different. This is not limited in the embodiments of the present invention.

It should be further understood that, in the embodiments of the present invention, a terminal device includes but is not limited to user equipment (UE), a mobile station (MS), a mobile terminal, a mobile phone, a handset, portable equipment, or the like. The user equipment may communicate with one or more core networks through a radio access network (RAN). For example, the user equipment may be a mobile phone (also referred to as a "cellular" phone) or a computer having a wireless communications function. The user equipment may be alternatively a portable, pocket-sized, handheld, computer built-in, or in-vehicle mobile apparatus.

During a high-frequency communication process, a narrow beam needs to be used to ensure a propagation distance and a high beam gain, and beam alignment is performed to ensure communication quality. Therefore, transmission between a base station and different terminal devices is performed on different beam pairs. When transmitting a downlink control channel/signal, the base station needs to traverse all beam directions to ensure that terminal devices in different locations are covered. A general method for receiving a downlink control signal/channel by the terminal device is blind detection, and the terminal device detects its own downlink control signal/channel on a resource, specified in a protocol, of the downlink control channel. To simplify blind detection, the base station notifies the terminal device of a beam scheduling order of the downlink control channel, so that the terminal device knows its corresponding downlink beam, and needs to perform blind detection only in the corresponding downlink beam. This simplifies blind detection but increases signaling overheads. An embodiment of the present invention proposes a method for transmitting a downlink control signal/channel, to simplify blind detection as well as to reduce signaling overheads.

The method for transmitting a downlink control signal proposed in this embodiment of the present invention includes: sending, by a base station, one or more radio frames, where the one or more radio frames include a plurality of OFDM symbols that carry synchronization signals. Each OFDM symbol that carries a synchronization signal is sent using one or more downlink beams of the base station, and the OFDM symbol that carries the synchronization signal further carries a downlink control signal.

At least two OFDM symbols are sent using different beams, and in downlink beams of the plurality of OFDM symbols that carry the synchronization signals, each transmit beam of the base station may be traversed.

The at least two OFDM symbols carry different beam numbers, or the at least two OFDM symbols carry different reference signal sequences that are used to indicate beam numbers, or the at least two OFDM symbols carry different reference signal resource numbers that are used to indicate beam numbers.

A terminal device receives the OFDM symbol that carries the synchronization signal and that is sent by the base station. The OFDM symbol that carries the synchronization signal further carries the downlink control signal.

The terminal device detects the downlink control signal in a specified resource element location of the OFDM symbol that carries the synchronization signal.

The foregoing separately describes the method for transmitting a downlink control signal from the perspective of the base station and from the perspective of the terminal device.

In an embodiment, the downlink control signal is sent by the base station using a downlink beam aligned with the terminal device. For example, an OFDM symbol that carries a synchronization signal and that is sent by the base station using the downlink beam aligned with the terminal device further carries the downlink control signal for the terminal device.

In the foregoing method embodiment, a frame structure used for high-frequency communication is proposed, and may be referred to as a synchronization radio frame. For example, a radio frame may include a plurality of subframes, and at least one subframe is used for downlink synchronization and beam scanning, and may be referred to as a synchronization subframe. The synchronization subframe includes a plurality of OFDM symbols, and each OFDM symbol includes a plurality of resource elements (REs). The synchronization signal occupies some REs (a part of or all of an OFDM symbol), and each OFDM symbol may be sent by using N different beams (N is greater than or equal to 1). In other words, the base station may send the N different beams using N antenna ports, and the terminal device may distinguish between different beams of a same OFDM symbol using different antenna ports. Different OFDM symbols may be sent using beams in different directions, and in all OFDM symbols that carry synchronization signals, each transmit beam of the base station may be traversed, to ensure that terminal devices in different locations can receive the OFDM symbols that carry the synchronization signals. When obtaining a synchronization signal of a specific beam of the base station by scanning, the terminal device may determine a downlink beam that is of the base station and that is aligned with the terminal device. The terminal device also determines an uplink beam that is of the terminal device and that is aligned with the base station. Beam alignment and downlink synchronization are completed between the base station and the terminal device. The base station continuously sends the radio frame, to perform downlink synchronization with different terminal devices.

In a specific embodiment, as shown in FIG. 1, a length of a radio frame is 10 ms. Each radio frame includes 50 subframes whose lengths are the same and numbers are sequentially 0 to 49. Subframe 0 and subframe 25 are used for downlink synchronization and beam scanning, and may be referred to as synchronization subframes. Each subframe includes 14 OFDM symbols whose numbers are sequentially 0 to 13. Each OFDM symbol includes a plurality of resource elements (REs). For example, an OFDM symbol may include 100 REs, and some REs are used to carry a primary synchronization signal (PSS), a secondary synchronization signal (SSS), and an extended synchronization signal (ESS). For example, 18 REs in the middle of each OFDM symbol may be used to carry a primary synchronization signal (PSS), a secondary synchronization signal (SSS), and an ESS. In addition, a part of the remaining 82 REs may be used as a physical downlink control channel (PDCCH), which is used to carry some downlink control signals such as a random access response and paging information. Another part of the remaining 82 REs may be used as a physical control format indicator channel (PCFICH), which is used to carry, for example, downlink control signals such as a control format indicator (CFI). Still another part of the REs may be used as a physical downlink shared channel (PDSCH), which is used to carry, for example, paging information such as a paging occasion (PO). Each type of downlink control signal may be set to occupy an RE in a fixed location, so that when receiving an OFDM symbol that carries a synchronization signal and that is sent by a high-frequency base station, the terminal device may search an RE in a corresponding location for a corresponding downlink control signal.

The frame structure shown in FIG. 1 is merely an embodiment, and the present invention is not limited to the foregoing frame structure.

In the method for transmitting a downlink signal described in the foregoing embodiment, the downlink control signal is placed in the OFDM symbol that carries the synchronization signal, and further is sent by the base station using a downlink beam aligned with the terminal device. Therefore, the base station does not need to separately send signaling to notify the terminal device of a resource of the downlink control signal, thereby simplifying blind detection as well as reducing signaling overheads.

Figure 3:
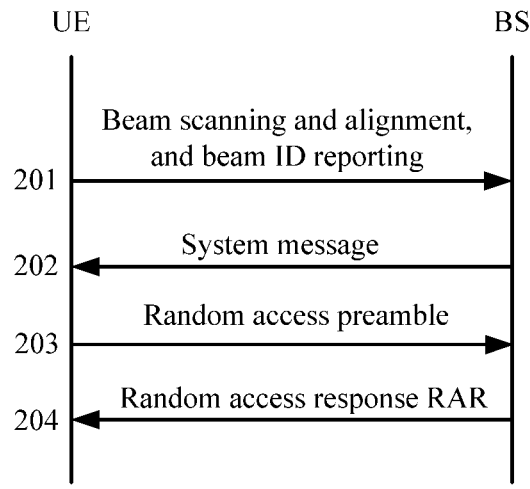
FIG. 3 is a flowchart of a method for transmitting a downlink control signal according to an embodiment of the present invention.

The following embodiment describes, in detail, a method for sending a downlink synchronization signal in a high-frequency communications system with reference to a network access process. Referring to FIG. 3, the method includes the following steps.

201. A terminal device accesses a base station, and completes beam scanning and alignment and downlink synchronization with the base station, where during this process, the base station traverses each beam direction to send an OFDM symbol that carries a synchronization signal; and after detecting the synchronization signal, the terminal device reports, to the base station, a beam ID of a beam to which the synchronization signal belongs, and beam alignment and downlink synchronization are completed between the base station and the terminal device.

For example, during a synchronization process between the terminal device and the base station, the base station sends a radio frame carrying a synchronization signal. A frame structure of the radio frame is described above, and details are not described herein again. Because OFDM symbols that carry synchronization signals in the radio frame are sent using beams in different directions, in all the OFDM symbols that carry the synchronization signals, each transmit beam of the base station may be traversed, so that terminal devices in different locations may receive the synchronization signals. One terminal device is used as an example. When detecting a synchronization signal, the terminal device may determine a downlink beam to which the synchronization signal belongs, and report a beam ID of the downlink beam to the base station. In this case, the base station and the terminal device complete beam scanning and alignment.

If the radio frame shown in FIG. 1 is used, the synchronization signals are carried by OFDM symbols of subframe 0 and subframe 25, and occupy some REs thereof. Each OFDM symbol may be sent using one or more different beams, and in the OFDM symbol that carries the synchronization signal, transmit beams in different directions of the base station may be traversed, to ensure that the terminal devices in different locations may receive the synchronization signals. When detecting a synchronization signal, a specific terminal device reports, to the base station, a beam ID of a beam to which the synchronization signal belongs, and therefore, the base station may learn of a beam ID corresponding to each terminal device.

202. Optionally, the base station sends system information in a corresponding beam to the terminal device based on the beam ID reported by the terminal device, where the system information may be sent through a physical broadcast channel (PBCH).

A processing manner similar to that of the downlink control signal may also be used for the system information, and the system information may be placed in the OFDM symbol that carries the synchronization signal, and sent using the downlink beam aligned with the terminal device. To be specific, some RE resources in the OFDM symbol that carries the synchronization signal are set as a PBCH, to transmit the system information.

203. The terminal device sends a random access preamble to the base station using an uplink beam in which the synchronization signal is detected, where the random access preamble may be sent through a physical random access channel (PRACH).

204. The base station sends a random access response (RAR) to the terminal device using a beam corresponding to the beam ID reported by the terminal device, where the RAR is carried by the OFDM symbol that carries the synchronization signal and that is sent by the base station. In other words, the base station sends, to the terminal device using a downlink beam aligned with the terminal device, the OFDM symbol that carries the synchronization signal, where the OFDM symbol that carries the synchronization signal further carries the RAR. The RAR occupies a PDCCH resource. Therefore, in the OFDM symbol that carries the synchronization signal, some REs other than REs that carry the synchronization signal are always used as the PDCCH resource, to place the RAR.

For example, if the frame structure shown in FIG. 1 is used, in step 201, when the base station and the terminal device perform beam scanning and alignment, the terminal device detects a synchronization signal in a $13^{th}$ OFDM symbol in subframe 0 sent using a specific beam, and the terminal device synchronizes with the beam used by the $13^{th}$ OFDM symbol in subframe 0 sent by the base station, the terminal device reports a beam ID of the beam to the base station, and the base station learns of the beam corresponding to the terminal device. In other words, the base station aligns the beam of the terminal device. After receiving a preamble sent by the terminal device, the base station adds a random access response RAR of the terminal device to the $13^{th}$ OFDM symbol in subframe 0 of the radio frame carried by the beam aligned with the terminal device. The terminal device detects a PDCCH resource in a corresponding location in the $13^{th}$ OFDM symbol, to obtain the RAR. In this case, some REs in the $13^{th}$ OFDM symbol are used as the PDCCH resource to carry the RAR. Locations of REs that are specifically used to carry the RAR in the OFDM symbol may be preset.

In this way, the terminal device knows an OFDM symbol in which the PDCCH is to be searched for, and the base station does not need to separately send signaling to notify the terminal device of a resource corresponding to the PDCCH.

In the foregoing embodiment, the RAR is used as an example of the downlink control signal for description. In addition, the downlink control signal is not limited to the RAR, and may be of another type. For example, in another embodiment, the downlink control signal may be paging information for the terminal device, such as a paging occasion (PO), and the PO is placed in the OFDM symbol that carries the synchronization signal. To be specific, some REs in the OFDM symbol that carries the synchronization signal are always used as a PDCCH resource or a PDSCH resource, and some REs in the PDCCH or PDSCH resource are always used to carry the PO. A radio frame is used as a period. The PO may be carried by each OFDM symbol that carries a synchronization signal, or the PO may be carried by some OFDM symbols that carry the synchronization signals. For example, one or more radio frames are used as a period, and the PO is carried, at intervals of one or more radio frames, in an OFDM symbol that carries a synchronization signal.

Figure 2:
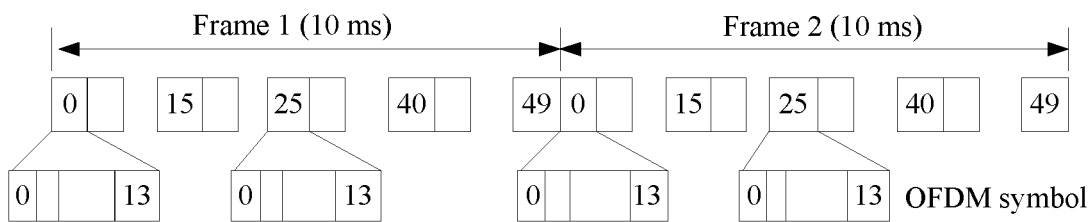
FIG. 2 is a schematic diagram of a frame structure of a synchronization radio frame carrying a downlink control signal according to another embodiment of the present invention.

The OFDM symbol (also carrying the synchronization signal) that carries the PO may be sent using one or more beams, and in the plurality of OFDM symbols, each transmit beam of the base station may be traversed. If traversing downlink beams, carrying POs, in the OFDM symbols that carry the synchronization signals once is referred to as a PO traversal process, a period of the PO traversal process may be an integer multiple of a beam traversal period of the synchronization signal. In other words, a PO traversal process is performed once at an interval of the integer multiple of the beam traversal period of the synchronization signal. The PO is carried by OFDM symbols that carry synchronization signals only in some beam traversal periods of the synchronization signals. As shown in FIG. 2, there are a total of 50 subframes in a 10-ms radio frame. Subframe 0 and subframe 25 are synchronization subframes, each subframe includes 14 OFDM symbols, and two subframes include a total of 28 OFDM symbols. Each OFDM symbol may be sent using a plurality of beams, and in beams corresponding to the 28 OFDM symbols, all transmit beams of the base station are traversed. In other words, the beam traversal period of the synchronization signal is a length of one radio frame. If a period twice the beam traversal period of the synchronization signal is used as the period of the PO traversal process, the PO may be carried by each OFDM in subframe 0 and subframe 25 in a frame 1, and the PO is not carried by subframe 0 and subframe 25 in a frame 2. The PO is carried again in each OFDM symbol in subframe 0 and subframe 25 in a frame 3. In other words, the PO is carried at intervals of one frame, and the PO is carried only in the OFDM symbol that carries the synchronization signal. Certainly, the PO may be carried at intervals of two or more frames. This may save system resources.

The PO is used as an example of the downlink control signal in the following embodiment to describe the method for transmitting a downlink control signal.

First, after the base station performs downlink synchronization with the terminal device, the terminal device reports the beam ID of the downlink beam used in the downlink synchronization to the base station. This process is similar to the process described in step 201, and details are not described again. If the terminal device is handed over to another downlink beam during a communication process due to, for example, movement of the terminal device or an environment effect, an ID, stored in the base station, of the downlink beam aligned with the terminal device also needs to be changed accordingly, and beam scanning and alignment may be performed again. In short, the base station stores a beam ID of a downlink beam corresponding to any terminal device that camps on the base station.

Second, when the base station needs to page a specific terminal device, the base station adds paging information of the terminal device to an OFDM symbol that carries a synchronization signal and that is sent using the downlink beam aligned with the terminal device. To be specific, the OFDM symbol sent using the downlink beam aligned with the terminal device not only carries the synchronization signal, but also carries the paging information for the terminal device, such as a PO, and the PO for the terminal device is sent only on the beam aligned with the terminal device. Similar to the manner of carrying the RAR in the foregoing embodiment, some RE resources other than the RE resources carrying the synchronization signal in the OFDM symbol are used as the PDCCH. Some REs are used to carry the RAR, and some REs are used to carry the PO. Locations of fixed REs occupied by the RAR and the PO may be preset in the OFDM symbol. Certainly, the PO may occupy a PDSCH resource.

The PO may include a paging radio network temporary identifier (P-RNTI) and resource information of a paging message for the terminal device. For example, similar to practice in LTE, the PO may include a P-RNTI corresponding to the terminal device, and carry the resource information of the paging message for the terminal device. In this way, the terminal device detects the P-RNTI of the terminal device in a PO in an OFDM symbol that carries a synchronization signal in a corresponding downlink beam, further detects resource information, corresponding to the terminal device, in the PO, and receives, on a corresponding resource (for example, a PDSCH resource), the paging message for the terminal device based on the resource information.

The PO is placed in a preset fixed location in the frame structure, and the corresponding PO of the terminal device is placed in an OFDM symbol that carries a synchronization signal and that is in a downlink beam corresponding to the terminal device. Regardless of whether the terminal device is in an idle mode or a connected mode, the terminal device knows an OFDM symbol that carries a synchronization signal in which the PO is to be detected. This reduces PO detection space, and makes it very convenient for the base station to page a terminal device for which a link has poor quality or is interrupted in high-frequency communication.

In another embodiment, the OFDM symbol that carries the synchronization signal and that corresponds to the terminal device may further carry control format indicator information, which is used to indicate a format of the physical downlink control channel. Specifically, some REs in the OFDM symbol that carries the synchronization signal are used as a physical control format indicator channel (PCFICH) resource. In other words, some REs in the OFDM symbol that carries the synchronization signal are always used as the PCFICH resource, to carry the control format indicator information.

Because the terminal devices in different beam directions have different traffic volume requirements, amounts of the PDCCH resources allocated by the base station to the terminal devices may also be different in different beam directions, and may be dynamically adjusted. The PCFICH may be used to indicate PDCCH resource allocation in each beam direction. The PCFICH is placed in the OFDM symbol that carries the synchronization signal in the radio frame, and the PCFICH placed in the OFDM symbol that carries the synchronization signal includes PDCCH resource format information in a beam direction corresponding to the synchronization signal, namely, PDCCH resource distribution in the beam direction corresponding to the PCFICH. For example, a PCFICH (carrying format indication information of the PDCCH resource) sent using a beam 1 indicates PDCCH resource allocation for the beam 1. Specifically, the format indication information of the PDCCH resource may include a location of the PDCCH resource in the beam direction, a quantity of occupied OFDM symbols, and the like. The terminal device corresponding to the beam direction detects the PCFICH resource in the synchronization signal, and detects a PDCCH of the terminal device in a corresponding PDCCH resource according to an indication of the PCFICH, thereby reducing PDCCH detection space.

The PCFICH is placed in the OFDM symbol that carries the synchronization signal, and the PCFICH placed in the OFDM symbol that carries the synchronization signal is used to indicate PDCCH resource format information in the beam direction corresponding to the synchronization signal. In other words, the OFDM symbol that carries the synchronization signal and the PCFICH is sent using beams in various directions. A PCFICH sent in a specific beam direction indicates PDCCH resource format information in the beam direction, for example, a PDCCH resource location in the beam direction or a quantity of occupied OFDM symbols. The terminal device corresponding to the beam direction detects the PCFICH in the OFDM symbol that carries the synchronization signal, and detects a PDCCH of the terminal device in a corresponding PDCCH resource according to the control format indication of the PCFICH, thereby reducing the PDCCH detection space.

The PDCCH resource format information may indicate PDCCH resource allocation in the beam direction in one beam traversal period of an OFDM symbol that carries a synchronization signal. For example, in the frame structure shown in FIG. 1, there are 50 subframes in a 10-ms radio frame. Subframe 0 and subframe 25 are synchronization subframes. Each subframe includes 14 OFDM symbols, and each OFDM symbol may be sent using a plurality of beams. In the 28 OFDM symbols, all beam directions of the base station are traversed. In other words, a synchronization beam traversal period is one radio frame. Some REs in each OFDM symbol that carries a synchronization signal, for example, in any OFDM symbol in subframe 0, are fixed to transmit a PCFICH. The symbol may be sent using a plurality of beams, and a CFI sent in each beam direction of the OFDM symbol indicates PDCCH resource allocation information in the beam direction in one beam traversal period of the OFDM symbol that carries the synchronization signal. The PDCCH resource allocation information specifically includes allocation information of a PDCCH resource that is sent in the beam direction and that is not included in subframe 0 or subframe 25 in the radio frame. The PDCCH resource allocation information may include a number of a subframe in which a PDCCH is located, a sequence number of an occupied OFDM symbol in the subframe, and the like.

In LTE, a PCFICH is located in the first OFDM symbol of a subframe, carries a Control Format Indicator (CFI), and is used to indicate a quantity of symbols occupied by a PDCCH in the subframe. In the high-frequency communications system, because the terminal devices in different beam directions have different traffic volume requirements, amounts of the PDCCH resources allocated by the base station to the terminal devices may also be different in different beam directions, and may be dynamically adjusted. In this case, a function of indicating PDCCH allocation in each beam direction may be added to the PCFICH.

The CFI is placed in the OFDM symbol that carries the synchronization signal, and the CFI placed in the OFDM symbol that carries the synchronization signal is used to indicate PDCCH resource format information in a beam direction corresponding to the synchronization signal. The PDCCH resource format information may include PDCCH resource allocation in the beam direction in one beam traversal period of the OFDM symbol that carries the synchronization signal, and the like. A CFI carried by an OFDM symbol that carries a synchronization signal in each beam direction is used to indicate PDCCH resource allocation information in the beam direction, and is used to indicate an OFDM symbol in which a PDCCH in the beam direction is located. In other words, in one beam traversal period of the synchronization signal, resource allocation information of the PDCCH in another OFDM symbol different from the OFDM symbol that carries the synchronization signal indicates an OFDM symbol in which the PDCCH is specifically located.

The CFI occupies a PCFICH resource, in other words, some REs in the OFDM symbol that carries the synchronization signal are used as the PCFICH.

In the foregoing embodiments, the RAR, PO, and CFI are used as examples of the downlink control signals to describe the method for transmitting a downlink control signal. However, types of the downlink control signal are not limited to the foregoing three types. The method may also be applied to a downlink control signal of another type.

The foregoing method for transmitting a downlink control signal may also be applied to transmission of the PDCCH or the PCFICH.

Based on the foregoing method embodiment, corresponding apparatus embodiments are further provided as follows.

Figure 5:
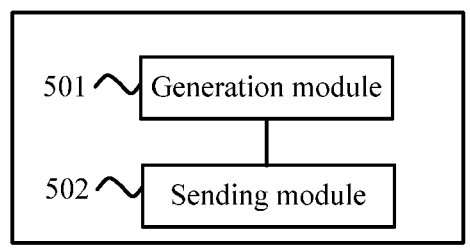
FIG. 5 is a schematic diagram of an apparatus for transmitting a downlink control signal according to an embodiment of the present invention.

Referring to FIG. 5, a base station is provided, including: a generation module 501, configured to generate one or more radio frames; and a sending module 502, configured to send the one or more radio frames, where the one or more radio frames include a plurality of OFDM symbols that carry synchronization signals, each OFDM symbol that carries a synchronization signal is sent by using one or more downlink beams of the base station, in downlink beams of the plurality of OFDM symbols that carry the synchronization signals, each transmit beam of the base station is traversed, and the OFDM symbol that carries the synchronization signal further carries a downlink control signal.

Figure 6:
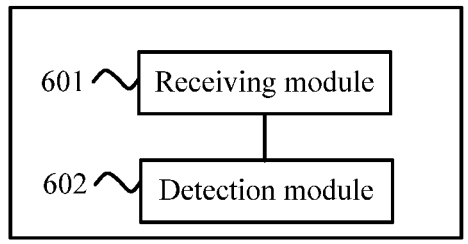
FIG. 6 is a schematic diagram of an apparatus for transmitting a downlink control signal according to another embodiment of the present invention.

Referring to FIG. 6, a terminal device is provided, including: a receiving module 601, configured to receive an OFDM symbol that carries a synchronization signal and that is sent by a base station by using a downlink beam aligned with the terminal device, where the OFDM symbol that carries the synchronization signal further carries a downlink control signal; and a detection module 602, configured to detect the downlink control signal in a specified resource element location of the OFDM symbol that carries the synchronization signal.

In the foregoing apparatus embodiments, a corresponding function module is configured to perform a corresponding step in the method embodiment. For detailed steps, refer to a corresponding method. Description is not given herein again.

In an apparatus embodiment in another form, the receiving module may be implemented by a receiver, the sending module may be implemented by a transmitter, and other corresponding function modules such as the generation module and the detection module may be implemented by a processor. For details, refer to FIG. 9. Details are not described herein again.

Available resources in an OFDM symbol that carries a synchronization signal are limited, and are not enough to carry downlink control signals of all types. In another embodiment, a scheduling manner may be used. When a specific terminal device needs to use a dedicated PDCCH, the terminal device reports the requirement to the base station, and the base station allocates a PDCCH resource to the terminal device. In addition, the PDCCH resource is placed in the OFDM symbol that carries the synchronization signal, and the DFDM symbol is sent to the terminal device using a downlink beam aligned with the terminal device. The method is as follows.

A method for transmitting a PDCCH resource is provided, including: receiving, by a base station, a PDCCH resource request message sent by a terminal device; and sending, by the base station to the terminal device by using a downlink beam aligned with the terminal device, a PDCCH resource allocated to the terminal device, where the PDCCH resource is located in an OFDM symbol that carries a synchronization signal.

A method for transmitting a PDCCH resource is provided, including: sending, by a terminal device, a PDCCH resource request message to a base station; and receiving, by the terminal device, a PDCCH resource that is sent by the base station by using a downlink beam aligned with the terminal device, where the PDCCH resource is allocated by the base station, and is located in an OFDM symbol that carries a synchronization signal.

In the foregoing method, a PDCCH resource is fixed in the OFDM symbol that carries the synchronization signal, and the PDCCH resource is to be scheduled and used by the terminal device. In a premise of the method, beam scanning is completed between the base station and the terminal device, and the downlink beam aligned with the terminal device is determined. The beam scanning and alignment are described in the foregoing embodiments, and description is not given herein again.

Figure 4:
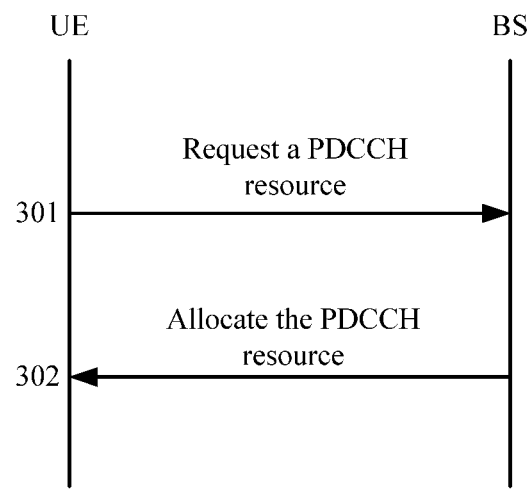
FIG. 4 is a flowchart of a method for transmitting a downlink control signal according to another embodiment of the present invention.

Referring to FIG. 4, the method specifically includes the following steps.

301. A terminal device sends a request message to a base station BS to request a PDCCH resource.

The terminal device requests a dedicated PDCCH resource from the BS to transmit a downlink control signal such as a RAR or a PO, or may request a dedicated PDCCH resource to transmit a particular downlink control signal such as an uplink grant or a resource allocation indicator. The request message may carry information such as a terminal device ID and a request reason (for example, a service type of the terminal device has a low requirement on a transmission latency, the terminal device is a slow moving user, or the terminal device requires low power consumption for power saving). Signaling for requesting the PDCCH resource by the terminal device may be carried by a message sent by the terminal device in a random access procedure, for example, carried by message 3 in the random access process, or may be carried by using higher layer signaling, such as RRC signaling. Alternatively, dedicated signaling may be used.

302. The base station allocates the PDCCH resource to the terminal device, where the PDCCH resource is located in the OFDM symbol that carries the synchronization signal, and the OFDM symbol is sent by using the downlink beam aligned with the terminal device.

In the foregoing embodiment, step 301 is optional. In another embodiment, the BS may allocate a dedicated PDCCH resource (or a dedicated PDCCH resource used for a particular downlink control signal) to the terminal device based on a feature or a service type of the terminal device, and the terminal device does not need to send the request message to the BS. The PDCCH resource is located in an OFDM symbol that carries a synchronization signal in a downlink beam direction of the terminal device, and is notified to the terminal device (for example, the PDCCH resource may be carried by using higher layer signaling such as the RRC signaling, or may be transmitted through a broadcast channel). In the method, the PDCCH resource does not need to be allocated in particular, reducing signaling overheads and simplifying blind detection, and further reducing power consumption of the terminal device.

A frame structure used in the step is similar to that in the foregoing embodiments, and details are not described again.

The BS adds, to the allocated dedicated PDCCH resource, a physical downlink control signal to be sent to the terminal device, and sends the physical downlink control signal by using the downlink beam aligned with the terminal device. To be specific, the physical downlink control signal is included in the OFDM symbol that carries the synchronization signal in the downlink beam direction of the terminal device, and occupies a fixed RE resource. The terminal device knows which OFDM symbol has a corresponding location in which a corresponding downlink control signal is to be searched for, so that blind detection does not need to be performed in each PDCCH resource block, as in the prior art. Therefore, the solution simplifies blind detection and reduces power consumption of the terminal device.

Based on the foregoing method embodiments, corresponding apparatus embodiments are further provided as follows.

Figure 7:
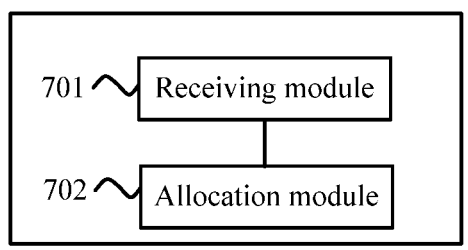
FIG. 7 is a schematic diagram of an apparatus for transmitting a downlink control signal according to an embodiment of the present invention.

Referring to FIG. 7, a base station is provided, including: a receiving module 701, configured to receive a PDCCH resource request message sent by a terminal device; and an allocation module 702, configured to send, to the terminal device by using a downlink beam aligned with the terminal device, a PDCCH resource allocated to the terminal device, where the PDCCH resource is located in an OFDM symbol that carries a synchronization signal.

Figure 8:
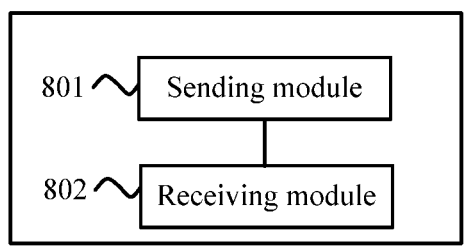
FIG. 8 is a schematic diagram of an apparatus for transmitting a downlink control signal according to another embodiment of the present invention.

Referring to FIG. 8, a terminal device is provided, including: a sending module 801, configured to send a PDCCH resource request message to a base station; and a receiving module 802, configured to receive a PDCCH resource that is sent by the base station using a downlink beam aligned with the terminal device, where the PDCCH resource is allocated by the base station, and is located in an OFDM symbol that carries a synchronization signal.

In the foregoing apparatus embodiments, a corresponding function module is configured to perform a corresponding step in the method embodiment. For detailed steps, refer to a corresponding method. Another corresponding step may also be implemented by a corresponding module, and description is not given herein again.

In an apparatus embodiment in another form, the receiving module may be implemented by a receiver, the sending module may be implemented by a transmitter, and other corresponding function modules such as the allocation module may be implemented by a processor. For details, refer to FIG. 9. Details are not described herein again.

In the foregoing embodiments, the base station may be referred to as a transmission reception point (TRP).

Figure 9:
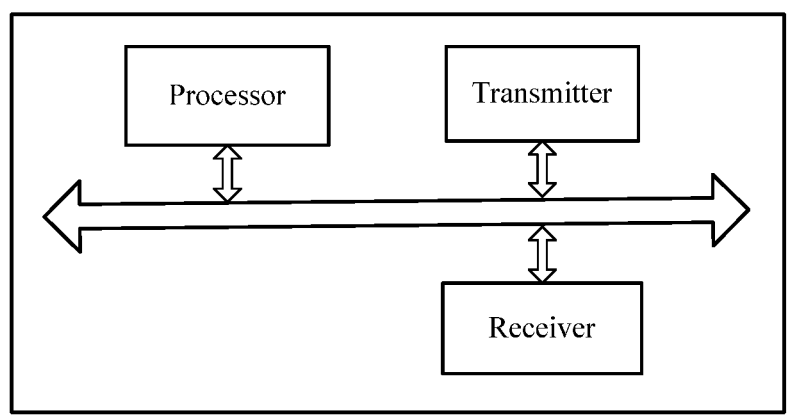
FIG. 9 is a schematic diagram of an apparatus for transmitting a downlink control signal according to another embodiment of the present invention.

Optionally, components in a device in FIG. 9 are coupled together by using a bus system. In addition to a data bus, the bus system further includes a power bus, a control bus, and a status signal bus.

In the foregoing embodiments, both the downlink control channel (or the downlink control signal) and the synchronization signal are arranged in a frequency division manner. To be specific, both the downlink control channel (or the downlink control signal) and the synchronization signal are placed in a same OFDM symbol, occupy different REs, and are different in frequency. Alternatively, the downlink control channel (or the downlink control signal) and the synchronization signal may be arranged in a time division manner, for example, are placed in different OFDM symbols, and may be adjacent in time. In addition, an OFDM symbol that carries the downlink control channel (or the downlink control signal) and an OFDM symbol that carries the synchronization signal form a block, and are sent by using a same beam but in different time.

An embodiment discloses a method for transmitting a downlink control signal, including: generating, by a base station, one or more radio frames; and sending, by the base station, the one or more radio frames, where the one or more radio frames include a plurality of blocks, each block carries a synchronization signal and a downlink control signal, the synchronization signal and the downlink control signal are arranged in a time division manner, each block is sent by using one or more downlink beams of the base station, at least two blocks are sent by using different beams, and the plurality of blocks include at least two blocks that are consecutive in time.

According to another aspect, a method for transmitting a downlink control signal is disclosed, including: receiving, by a terminal device, a block that carries a synchronization signal and a downlink control signal and that is sent by a base station by using a downlink beam aligned with the terminal device, where the synchronization signal and the downlink control signal are arranged in a time division manner; and detecting, by the terminal device, the downlink control signal in a specified resource element location of the block.

The foregoing gives description from two aspects: the base station and the terminal device.

That at least two blocks are sent by using different beams is implemented in the following manner: The at least two blocks carry different beam numbers, or the at least two blocks carry different reference signal sequences that are used to indicate beam numbers, or the at least two blocks carry different reference signal resource numbers that are used to indicate beam numbers.

The synchronization signal includes a PSS and/or an SSS, and each block includes one PSS and/or one SSS.

The downlink control signal is carried by a PDCCH, a PCFICH, or a PDSCH, for example, the synchronization signal and a PDCCH (or a PCFICH or a PDSCH) resource occupy different time and may be arranged adjacently.

Based on the foregoing methods, the embodiments of the present invention further disclose another type of frame structure. One or more radio frames include a plurality of blocks, and the plurality of blocks may be consecutive or inconsecutive in time, and may include at least two blocks that are consecutive in time. For example, each block includes an OFDM symbol that carries a synchronization signal and an OFDM symbol that carries a downlink control channel (or a downlink control signal), each block is sent by using one or more downlink beams of the base station, and at least two blocks are sent by using different beams.

Further, in downlink beams of the plurality of blocks, each transmit beam of the base station may be traversed. The OFDM symbol that carries a downlink control channel (or the downlink control signal) and the OFDM symbol that carries the synchronization signal form a block, and all OFDM symbols in a same block are sent by using a same beam. The OFDM symbol that carries the downlink control channel (or the downlink control signal) and the OFDM symbol that carries the synchronization signal are different OFDM symbols.

The foregoing radio frame may include a plurality of subframes, and the plurality of blocks may be included in one or more subframes.

Further, each block may include a unit of synchronization signals, for example, one PSS and/or one SSS, and each block carries only one downlink control channel resource or downlink control signal.

Figure 10:
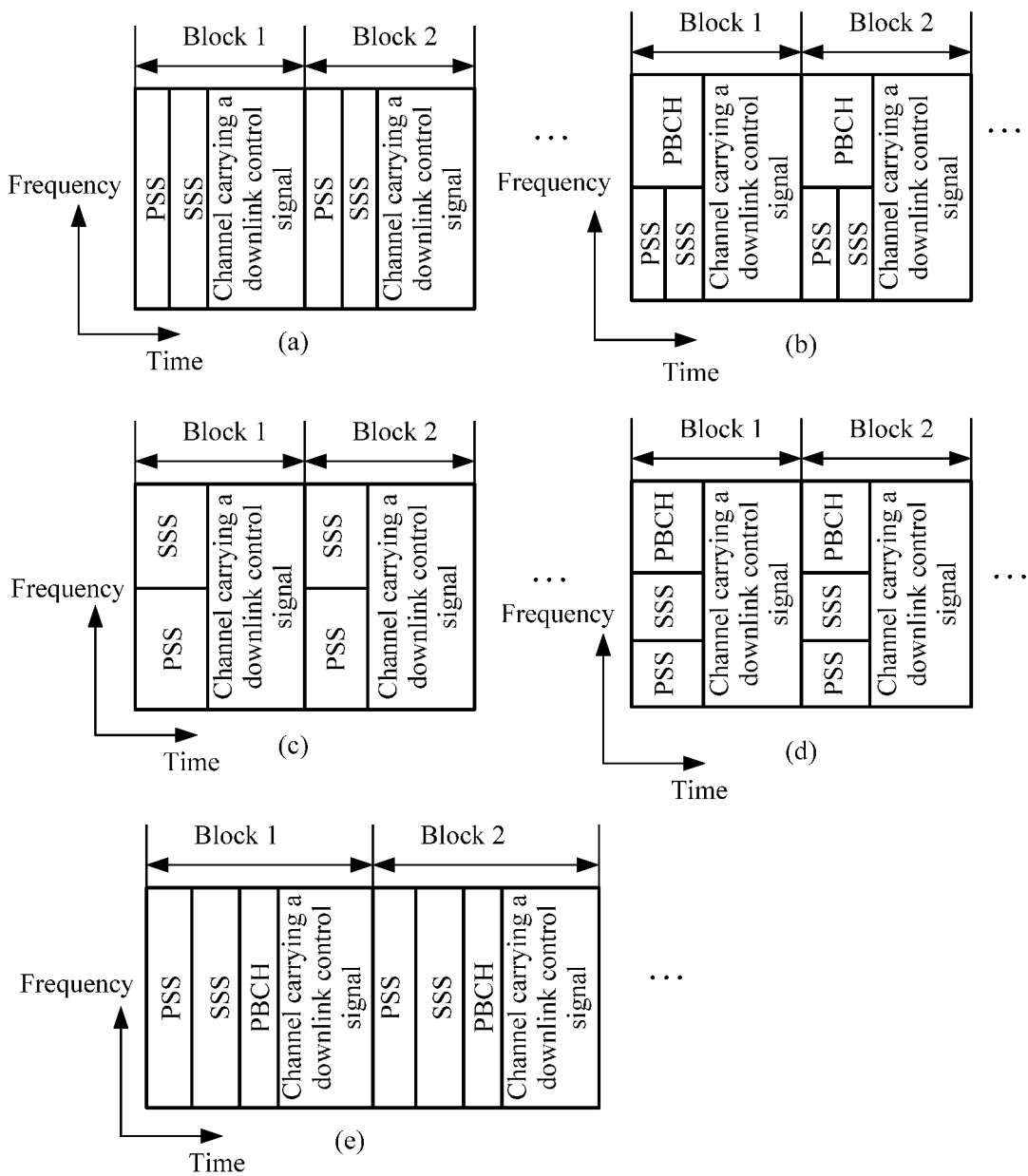
FIG. 10 is a schematic diagram of a block structure of a synchronization radio frame carrying a downlink control signal according to another embodiment of the present invention.

Referring to FIG. 10, the synchronization signal may include the PSS and/or the SSS, and may further include an ESS. The synchronization signal (the PSS or the SSS) and the downlink control channel resource (or the downlink control signal) may be arranged in a time division manner, as shown in (a). Further, a PBCH and the synchronization signal may be arranged in a frequency division manner, as shown in (b). The synchronization signal and the downlink control channel resource (or the downlink control signal) may be arranged in a time division manner, but the PSS and the SSS are arranged in a frequency division manner, as shown in (c). A PBCH arranged in a frequency division manner with the synchronization signal may be added based on (c), as shown in (d). The synchronization signal (the PSS or the SSS), the PBCH, and the downlink control channel resource (or the downlink control signal) may be arranged in a time division manner, as shown in (e).

The downlink control channel may be a PDCCH, a PCFICH, or a PDSCH.

The downlink control channel resource is used to carry the downlink control signal such as a RAR, a PO, or a CFI. For example, paging information is placed in the PDSCH, and then the PDSCH and the synchronization signal are arranged in a frequency division or time division manner.

Solutions in the foregoing frequency division embodiments may all be applied to the method for transmitting a downlink signal in a time division manner. Only the frame structure is changed, and another step or feature is similar thereto. Details are not described herein again. Refer to FIG. 1 to FIG. 4, and description of corresponding embodiments.

The embodiment, shown in FIG. 4, in which a resource is allocated in a scheduling manner may be alternatively implemented in a time division manner.

Corresponding to the foregoing corresponding method of the base station, an embodiment of the present invention further discloses an apparatus for transmitting a downlink control signal, namely, a base station. Referring to FIG. 5, the apparatus includes: a generation module, configured to generate one or more radio frames; and a sending module, configured to send the one or more radio frames, where the one or more radio frames include a plurality of blocks, each block carries a synchronization signal and a downlink control signal, the synchronization signal and the downlink control signal are arranged in a time division manner, each block is sent by using one or more downlink beams of the base station, at least two blocks are sent by using different beams, and the plurality of blocks include at least two blocks that are consecutive in time.

Corresponding to the foregoing corresponding method of the terminal device, an embodiment of the present invention further discloses a terminal device. Referring to FIG. 6, the terminal device includes: a receiving module, configured to receive a block that carries a synchronization signal and a downlink control signal and that is sent by a base station by using a downlink beam aligned with the terminal device, where the synchronization signal and the downlink control signal are arranged in a time division manner; and a detection module, configured to detect the downlink control signal in a specified resource element location of the block.

In the foregoing apparatus embodiments, a corresponding function module is configured to perform a corresponding step in the method embodiments. For detailed steps, refer to a corresponding method. Another corresponding step may also be implemented by a corresponding module, and description is not given herein again.

In an apparatus embodiment in another form, the receiving module may be implemented by a receiver, the sending module may be implemented by a transmitter, and other corresponding function modules such as the generation module and the detection module may be implemented by a processor. For details, refer to FIG. 9. Details are not described herein again.

It should be understood that in the embodiments of the present invention, the processor may be a central processing unit (CPU), or the processor 610 may be another general purpose processor, a digital signal processor (DSP), an application-specific integrated circuit (ASIC), a field programmable gate array (FPGA) or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory. For example, the memory may further store device type information.

The bus system may further include a power bus, a control bus, a status signal bus, and the like, in addition to a data bus. However, for clear description, various types of buses in the figure are marked as the bus system.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method performed by a base station, comprising:
generating, by the base station, one or more radio frames; and
sending, by the base station, the one or more radio frames, wherein the one or more radio frames comprise a plurality of blocks and a plurality of downlink control signals, each block of the plurality of blocks carries a physical broadcast channel (PBCH) and a respective synchronization signal, wherein, for each block of the plurality of blocks, the respective synchronization signal carried in the respective block is arranged in a frequency division manner with a downlink control signal of the plurality of downlink control signals, and for each block, the respective synchronization signal of the respective block and the downlink control signal arranged in the frequency division manner with the respective synchronization signal of the respective block are sent using a same beam of the base station, at least two blocks of the plurality of blocks are sent using different beams, and at least two downlink control signals of the plurality of downlink control signals that are arranged in the frequency division manner with synchronization signals of the at least two blocks are sent using different beams.

2. The method according to claim 1, wherein:
each block of the at least two blocks carries a different beam number;
each block of the at least two blocks carries a different reference signal sequence indicating a respective beam number; or
each block of the at least two blocks carries a different reference signal resource number indicating a respective beam number.

3. The method according to claim 1, wherein, for each block of the plurality of blocks, the respective synchronization signal carried in the respective block and the respective downlink control signal arranged in the frequency division manner with the respective synchronization signal carried in the respective block are carried by same orthogonal frequency division multiplexing (OFDM) symbols.

4. The method according to claim 1, wherein the respective synchronization signal carried in each block comprises a primary synchronization signal (PSS) or a secondary synchronization signal (SSS).

5. The method according to claim 1, wherein each of the plurality of downlink control signals is respectively a random access response signal, a resource allocation information signal, a paging information signal, or a control format indicator signal.

6. The method according to claim 1, wherein each of the plurality of downlink control signals is respectively carried by a physical downlink control channel (PDCCH) or a physical downlink shared channel (PDSCH).

7. The method according to claim 1, wherein the at least two blocks are consecutive in time, and are located in one or more subframes of the one or more radio frames.

8. An apparatus, comprising:
a processor, configured to generate one or more radio frames; and
a transmitter, configured to send the one or more radio frames, wherein the one or more radio frames comprise a plurality of blocks and a plurality of downlink control signals, each block of the plurality of blocks carries a physical broadcast channel (PBCH) and a respective synchronization signal, wherein, for each block of the plurality of blocks, the respective synchronization signal carried in the respective block is arranged in a frequency division manner with a downlink control signal of the plurality of downlink control signals, and for each block, the respective synchronization signal of the respective block and the downlink control signal arranged in the frequency division manner with the respective synchronization signal of the respective block are sent using a same beam of the apparatus, at least two blocks of the plurality of blocks are sent by using different beams, and at least two downlink control signals of the plurality of downlink control signals that are arranged in the frequency division manner with synchronization signals of the at least two blocks are sent using different beams.

9. The apparatus according to claim 8, wherein:
each block of the at least two blocks carries a different beam number;
each block of the at least two blocks carries a different reference signal sequence indicating a respective beam number; or
each block of the at least two blocks carries a different reference signal resource number indicating a respective beam number.

10. The apparatus according to claim 8, wherein, for each block of the plurality of blocks, the respective synchronization signal carried in the respective block and the respective downlink control signal arranged in the frequency division manner with the respective synchronization signal carried in the respective block are carried by same orthogonal frequency division multiplexing (OFDM) symbols.

11. The apparatus according to claim 8, wherein:
each of the plurality of downlink control signals is respectively a random access response signal, a resource allocation information signal, a paging information signal, or a control format indicator signal; and
each of the plurality of downlink control signals is respectively carried by a physical downlink control channel (PDCCH) or a physical downlink shared channel (PDSCH).

12. A method performed by a terminal device, comprising:
receiving, by the terminal device, one or more symbols from a base station, wherein the one or more symbols include a downlink control signal and a block, the block carries a physical broadcast channel (PBCH) and a synchronization signal, wherein the block and the downlink control signal correspond to a same beam, the same beam corresponds to a downlink beam comprised in a plurality of downlink beams of the base station, and wherein the synchronization signal and the downlink control signal are arranged in a frequency division manner; and
detecting, by the terminal device, the downlink control signal in a specified resource element location of the one or more symbols.

13. The method according to claim 12, wherein the synchronization signal and the downlink control signal are carried by same orthogonal frequency division multiplexing (OFDM) symbols.

14. The method according to claim 12, wherein the downlink control signal is a random access response signal, a resource allocation information signal, a paging information signal, or a control format indicator signal.

15. The method according to claim 12, wherein the downlink control signal is carried by a physical downlink control channel (PDCCH) or a physical downlink shared channel (PDSCH).

16. An apparatus, comprising:
a receiver, configured to receive one or more symbols from a base station, wherein the one or more symbols include a downlink control signal and a block, the block carries a physical broadcast channel (PBCH) and a synchronization signal, wherein the block and the downlink control signal correspond to a same beam, the same beam corresponds to a downlink beam comprised in a plurality of downlink beams of the base station, and wherein the synchronization signal and the downlink control signal are arranged in a frequency division manner; and
a processor, configured to detect the downlink control signal in a specified resource element location of the one or more symbols.

17. The apparatus according to claim 16, wherein the downlink control signal is carried by a physical downlink control channel (PDCCH) or a physical downlink shared channel (PDSCH).

18. The apparatus according to claim 16, wherein the synchronization signal and the downlink control signal are carried by same orthogonal frequency division multiplexing (OFDM) symbols.

19. The apparatus according to claim 16, wherein the downlink control signal is a random access response signal, a resource allocation information signal, a paging information signal, or a control format indicator signal.

20. The apparatus according to claim 16, wherein the synchronization signal comprises a primary synchronization signal (PSS) or a secondary synchronization signal (SSS).

* * * * *